United States Patent
Puiu et al.

(10) Patent No.: US 9,387,752 B2
(45) Date of Patent: Jul. 12, 2016

(54) MULTI-MODE HYBRID VARIABLE DRIVE UNIT

(71) Applicants: Dumitru Puiu, Sterling Heights, MI (US); Scott A Miller, Northville, MI (US)

(72) Inventors: Dumitru Puiu, Sterling Heights, MI (US); Scott A Miller, Northville, MI (US)

(73) Assignee: FCA US LLC, Auburn Hills, MI (US)

(*) Notice: Subject to any disclaimer, the term of this patent is extended or adjusted under 35 U.S.C. 154(b) by 183 days.

(21) Appl. No.: 14/614,528

(22) Filed: Feb. 5, 2015

(65) Prior Publication Data

US 2015/0148172 A1    May 28, 2015

Related U.S. Application Data

(63) Continuation-in-part of application No. 13/718,612, filed on Dec. 18, 2012, now abandoned.

(51) Int. Cl.
*B60K 6/365* (2007.10)
*B60K 6/547* (2007.10)
(Continued)

(52) U.S. Cl.
CPC ............. *B60K 6/365* (2013.01); *B60K 6/387* (2013.01); *B60K 6/442* (2013.01); *B60K 6/445* (2013.01); *B60K 6/48* (2013.01); *B60K 6/547* (2013.01); *F16H 3/728* (2013.01); *B60K 2006/381* (2013.01); *B60K 2006/4816* (2013.01); *F16H 2037/0873* (2013.01); *F16H 2037/104* (2013.01); *F16H 2037/107* (2013.01); *F16H 2200/2007* (2013.01); *F16H 2200/2038* (2013.01); *F16H 2200/2064* (2013.01); *Y02T10/6221* (2013.01); *Y02T 10/6239* (2013.01); *Y02T 10/6256* (2013.01); *Y10S 903/911* (2013.01)

(58) Field of Classification Search
CPC ........ B60K 6/365; B60K 6/547; B60K 6/442; B60K 6/20; B60K 2006/266; Y10S 903/911; F16H 3/72; F16H 3/727
USPC ........................................ 475/5, 317
See application file for complete search history.

(56) References Cited

U.S. PATENT DOCUMENTS 5,916,050 A * 6/1999 Coutant et al. .......... 475/5
7,128,680 B2   10/2006 Holmes
(Continued)

FOREIGN PATENT DOCUMENTS

DE   102007022129 A1   11/2008
EP       1247679 A2   10/2002

OTHER PUBLICATIONS

International Search Report and Written Opinion dated May 28, 2014 for International Application No. PCT/US2013/075571, International Filing Date Dec. 17, 2013.

*Primary Examiner* — Colby M Hansen
(74) *Attorney, Agent, or Firm* — Ralph E. Smith

(57) ABSTRACT

A hybrid transmission providing multiple modes of operation in a compact arrangement is provided and includes first and second planetary gear sets and first and second electric machines. An electric machine shaft directly couples the first planetary gear set to the second planetary gear set and the second electric machine to the second planetary gear set. The second electric machine is selectively directly coupled to an output shaft via a first clutch mechanism, and indirectly coupled to the output shaft via the second planetary gear set and a drive shaft, which extends parallel to the electric machine shaft and external to the second electric machine. A second clutch mechanism selectively couples the first electric machine to a carrier of the second planetary gear set and a third clutch mechanism selectively couples a ring gear of the second planetary gear set to a hybrid drive unit housing.

17 Claims, 2 Drawing Sheets

(51) Int. Cl.
  *B60K 6/442* (2007.10)
  *B60K 6/387* (2007.10)
  *B60K 6/445* (2007.10)
  *B60K 6/48* (2007.10)
  *F16H 3/72* (2006.01)
  *B60K 6/38* (2007.10)
  *F16H 37/08* (2006.01)
  *F16H 37/10* (2006.01)

(56) References Cited

U.S. PATENT DOCUMENTS

| | | |
|---|---|---|
| 7,192,373 B2 | 3/2007 | Bucknor et al. |
| 2008/0207375 A1 | 8/2008 | Shimizu et al. |
| 2010/0210388 A1 | 8/2010 | Grochowski et al. |
| 2011/0053724 A1 | 3/2011 | Phillips |
| 2011/0086737 A1 | 4/2011 | Phillips |
| 2011/0111907 A1* | 5/2011 | Kim et al. .......... 475/5 |

* cited by examiner

MULTI-MODE HYBRID VARIABLE DRIVE
UNIT

CROSS-REFERENCE TO RELATED
APPLICATIONS

This application is a continuation-in-part of U.S. patent application Ser. No. 13/718,612 filed on Dec. 18, 2012. The entire disclosure of the above application is incorporated herein by reference.

FIELD

The present disclosure relates generally to a hybrid drive unit, and more particularly, to a multi-mode hybrid variable drive unit having a compact design.

BACKGROUND

Many modern automobiles utilize a hybrid transmission system in which an internal combustion engine, electric machine(s), or combination of the two provides propulsion for the vehicle. In a typical hybrid transmission system, torque from the engine and electric machines is supplied to a plurality of gears to drive the wheels of the vehicle. Many typical hybrid transmissions provide only a single mode of operation. This single mode of operation presents overall system compromises. A decision must be made between a transmission that provides optimum torque during low speed operation or optimum efficiency for operation at highway speeds. Many typical hybrid transmissions are unable to provide both optimum low speed torque and highway speed efficiency. Typically, in an attempt to remedy this problem, large and powerful electric machines must be used. However, large and powerful electric machines are more expensive and take up more space within the hybrid transmission.

Alternatively, some hybrid transmissions provide multiple modes of operation whereby different transmission gear ratios may be achieved. However, typical prior art multi-mode hybrid transmissions include many gears and clutches and are very inefficient. For example, many prior art hybrid transmissions feature multiple planetary gear sets that must rotate at all times and lack availability of a selectable direct connection of one of the electric machines to the output shaft. This negatively impacts vehicle fuel economy. Moreover, many prior art hybrid transmissions often requiring numerous offset axes of rotation resulting in transmissions that are complex and large in size. This increases manufacturing costs and makes it difficult to package the hybrid transmission within the vehicle. Therefore, improvement in the art is desirable.

SUMMARY

In accordance with one exemplary aspect of the invention, a hybrid drive unit is provided and includes first and second planetary gear sets, first and second electric machines, input and output shafts, a drive shaft, an electric machine shaft and at least first and second clutch mechanisms. In an exemplary implementation, the first planetary gear set is connected to the input shaft and the second planetary gear set is connected to the first planetary gear set by the electric machine shaft. The first electric machine is connected to the first planetary gear set and the second electric machine is connected to the first and second planetary gear sets by the electric machine shaft. The output shaft is selectively directly coupled to the electric machine shaft by the first clutch mechanism, where the input shaft, electric machine shaft and output shaft are distinct shafts that share a common axis of rotation. The drive shaft is connected to the second planetary gear set by a first driven gear and to the output shaft by at least one drive gear, where the drive shaft is parallel to and spaced apart from the electric machine shaft. The second clutch mechanism is configured to selectively couple the first electric machine to the second planetary gear set. The output shaft is configured to be i) selectively directly connected to the second electric machine via the electric machine shaft by activation of the first clutch mechanism and ii) indirectly coupled to the second electric machine via the second planetary gear set and the drive shaft.

In accordance with additional exemplary aspects, the drive shaft extends parallel to the electric machine shaft and external to the second electric machine. In one exemplary implementation, the hybrid drive unit further comprises a third clutch mechanism configured to selectively couple the second planetary gear set to a hybrid drive unit housing. The hybrid drive unit is configured to operate in three different modes of operation, each of the three modes of operation activated by activating at least one of the first, second and third clutch mechanisms.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
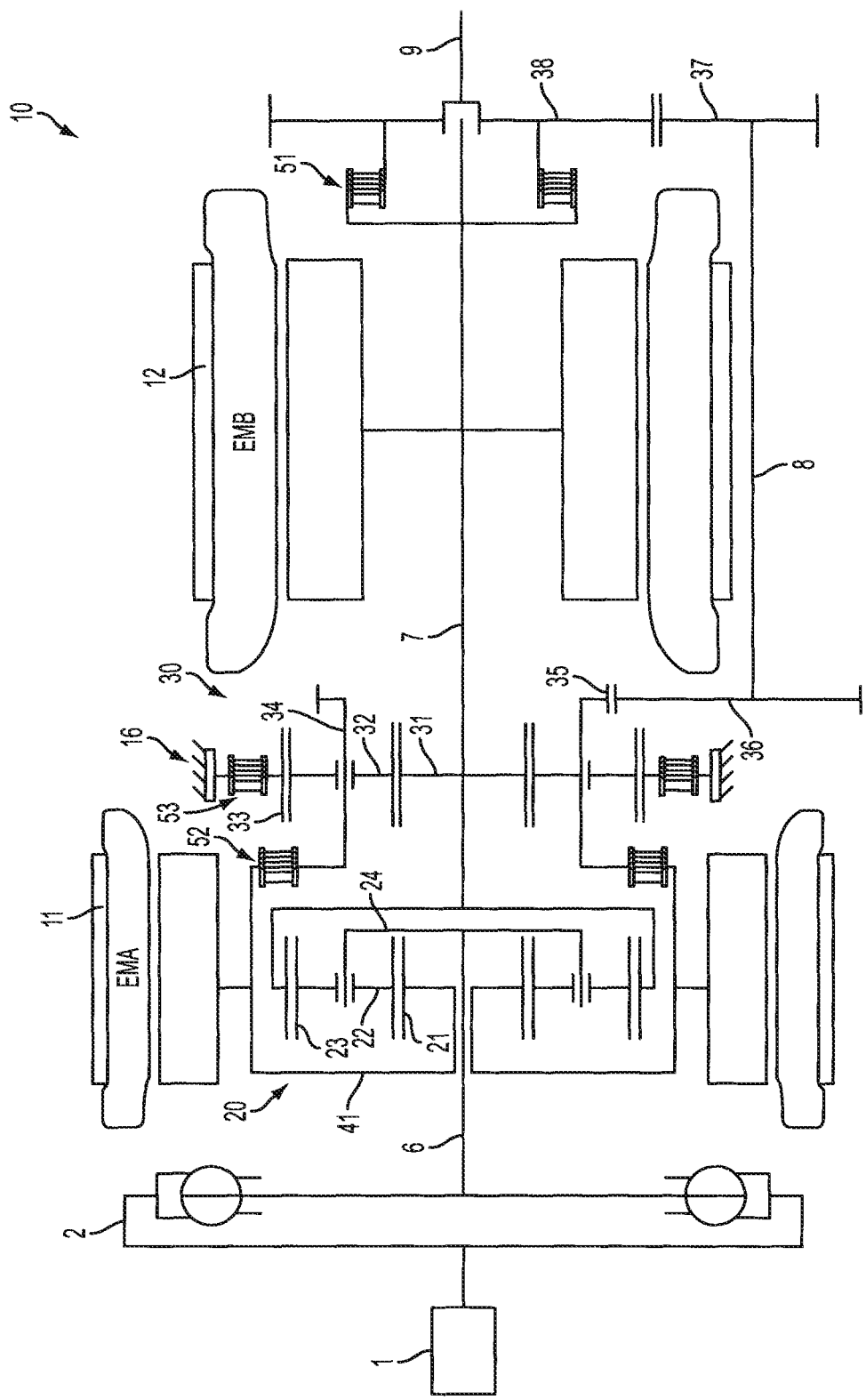
FIG. 1 is a schematic representation of an exemplary hybrid drive unit constructed in accordance with the disclosed principles.

FIG. 1 is an example schematic representation of a hybrid drive unit 10 according to an embodiment disclosed herein. An engine 1 is coupled to a torsional vibration damper 2. The engine 1 may be any type of power source including an internal combustion engine, turbine engine, electric machine, or any other desired power source. The torsional vibration damper 2 is coupled to a hybrid drive unit 10 by a hybrid input shaft 6. The hybrid input shaft 6 couples the torsional vibration damper 2 to a carrier 24 of a first planetary gear set 20. In the exemplary implementation illustrated, the input shaft 6 is directly coupled or connected to the carrier 24. A plurality of planet gears 22 are rotationally mounted on the carrier 24 and are continuously meshed with a sun gear 21 and a ring gear 23. The sun gear 21 is coupled by a shaft 41 to a first electric machine 11 ("EMA"). The ring gear 23 is coupled by a shaft 7 (which is also referred to herein as the "electric machine shaft") to a second electric machine 12 ("EMB"). In the exemplary implementation illustrated, shaft 41 is directly coupled or connected to the first electric machine 11. The first electric machine 11 and second electric machine 12 may be electric motors, electric generators, or any other type of desired power source.

Shaft 41 is also coupled to a second clutch mechanism 52 that selectively couples shaft 41 to a carrier 34 of a second planetary gear set 30. A plurality of planet gears 32 are rotationally mounted on the carrier 34 and are continuously meshed with a sun gear 31 and a ring gear 33. The ring gear 33 is also coupled to a third clutch mechanism 53. In the exemplary implementation illustrated, the ring gear 33 is directly coupled or connected to the third clutch mechanism 53. The third clutch mechanism 53 selectively couples the ring gear 33 to a hybrid assembly housing 16. The sun gear 31 is coupled to shaft 7. In the exemplary implementation illustrated, the sun gear 32 is directly coupled or connected shaft 7.

The carrier 34 is also coupled to a first driver gear 35 that is continuously meshed with a first driven gear 36. The first driven gear 36 is coupled by a shaft 8 (which is also referred to herein as the "drive shaft") to a second driver gear 37. The second driver gear 37 is continuously meshed with a second driven gear 38 that is coupled to an output shaft 9. Shaft 7 is also coupled to a first clutch mechanism 51 that selectively couples shaft 7 to the second driven gear 38. In the exemplary implementation illustrated, the shaft 7 is directly coupled or connected to the clutch mechanism 51, which is directly coupled or connected to the output shaft 9. In one exemplary implementation, shaft 7 is directly coupled or connected to each of the carrier 24 of the first planetary gear set 20, the sun gear 31 of the second planetary gear set 30, the second electric machine 12 and the first clutch mechanism 51 thereby providing for a common axis of rotation and reducing complexity and size of the hybrid drive unit 10.

The hybrid drive unit 10 is constructed or assembled as discussed above in a compact and efficient manner, such as by having shaft 6, shaft 7 and shaft 9 be concentric or share the common axis of rotation. In the exemplary implementation illustrated, shafts 6, 7 and 9 are distinct shafts that share the common axis of rotation and are serially arranged, as shown in FIG. 1. Shaft 8, in the exemplary implementation illustrated, is parallel to shaft 7 and provides another connection for second electric machine 12 to output shaft 9, such as via second planetary gear set 30, gears 35 and 36, and gear 37. Hybrid drive unit 10 may be configured, as shown in FIG. 1, to have shaft 8 extend outside of and parallel to second electric machine 12. In other words, the drive shaft 8 extends completely around the second electric machine 12 from driven gear 36 positioned between the first and second electric machines 11, 12 and the drive gear 37, which is positioned on an axially opposite side of second electric machine 12 as gear 36.

The hybrid drive unit 10 of FIG. 1 may be operated in three different modes referred to herein as Mode 1, Mode 2, and Mode 3. To operate the hybrid drive unit 10 in Mode 1, the third clutch mechanism 53 is activated, thereby, coupling the ring gear 33 to hybrid assembly housing 16. The first clutch mechanism 51 and second clutch mechanism 52 are deactivated. Thus, shaft 7 is free to rotate at a different RPM than second driven gear 38 and shaft 41 is free to rotate at a different RPM than carrier 34. Torque to the output shaft 9 may be provided by the engine 1 in combination with the second electric machine 12. The first electric machine 11 may be used to generate electricity during vehicle braking or as otherwise desired. In one embodiment, the hybrid drive unit 10 achieves a hybrid drive unit gear ratio of approximately 4.5:1 when operated in Mode 1.

To transition the hybrid drive unit 10 from operation in Mode 1 to operation in Mode 2, the first electric machine 11 is powered to cause the RPM of shaft 41 to approximately match the RPM of carrier 34. In one embodiment, the engine 1, second electric machine 12, first electric machine 11, or any combination of the three may be utilized to cause the RPM of shaft 41 to approximately match the RPM of carrier 34. Once the RPM of shaft 41 approximately matches the RPM of carrier 34, the second clutch mechanism 52 is activated followed by deactivation of the third clutch mechanism 53. In one embodiment, the shifting process includes activation of the second clutch mechanism 52 and deactivation of the third clutch mechanism 53 and takes approximately 500 milliseconds. In one embodiment, the shift takes more than 500 milliseconds. In another embodiment, the shift takes less than 500 milliseconds. A shift from Mode 2 to Mode 1 would be performed in a manner similar to the shift from Mode 1 to Mode 2 except that one, or any combination of the engine 1, second electric machine 12, first electric machine 11, would be utilized to cause the RPM of ring gear 33 to be approximately the same as the RPM of hybrid assembly housing 16. Then, the first clutch mechanism 53 would be activated, followed by deactivation of the second clutch mechanism 52.

To operate the hybrid drive unit 10 in Mode 2, the second clutch mechanism 52 is activated, thereby, coupling shaft 41 to carrier 34. The first clutch mechanism 51 and third clutch mechanism 53 are deactivated. Thus, shaft 7 is free to rotate at a different RPM than second driven gear 38 and ring gear 33 is free to rotate at a different RPM than hybrid assembly housing 16. Torque to the output shaft 9 may be provided by the engine 1 in combination with the first electric machine 11. The second electric machine 12 may be used to generate electricity during vehicle braking or as otherwise desired. When the hybrid drive unit 10 is operated in Mode 2, the second planetary gear set 30 is unlocked or open and unloaded. Unlocking and unloading the second planetary gear set 30 reduces friction losses within the hybrid drive unit 10. In one embodiment, the hybrid drive unit 10 achieves a hybrid drive unit gear ratio of between approximately 4.5:1 and 1:1 when operated in Mode 2.

To transition the hybrid drive unit 10 from operation in Mode 2 to operation in Mode 3, the engine 1 and second electric machine 12 are powered to cause the RPM of shaft 7 to approximately match the RPM of second driven gear 38. Simultaneously, the first electric machine 11 is operated at an approximately constant RPM. Once the RPM of shaft 7 approximately matches the RPM of second driven gear 38, the first clutch mechanism 51 is activated. In one embodiment, the shifting process includes activation of the first clutch mechanism 51 and takes approximately 500 milliseconds. In one embodiment, the shift takes more than 500 milliseconds. In another embodiment, the shift takes less than 500 milliseconds. A shift from Mode 3 to Mode 2 would be performed by simply deactivating the first clutch mechanism 51.

To operate the hybrid drive unit 10 in Mode 3, the first clutch mechanism 51 and second clutch mechanism 52 are activated. Thus, shaft 7 is coupled to second driven gear 38 and shaft 41 is coupled to carrier 34. The third clutch mechanism 53 is deactivated, thereby allowing ring gear 33 to rotate at a different RPM than hybrid assembly housing 16. Torque to the output shaft 9 may be provided by the engine 1 in combination with the second electric machine 12. The first electric machine 11 may be used to generate electricity during vehicle braking or as otherwise desired. In one embodiment, the hybrid drive unit 10 achieves a hybrid drive unit gear ratio of approximately 1:1 when operated in Mode 3.

Figure 2:
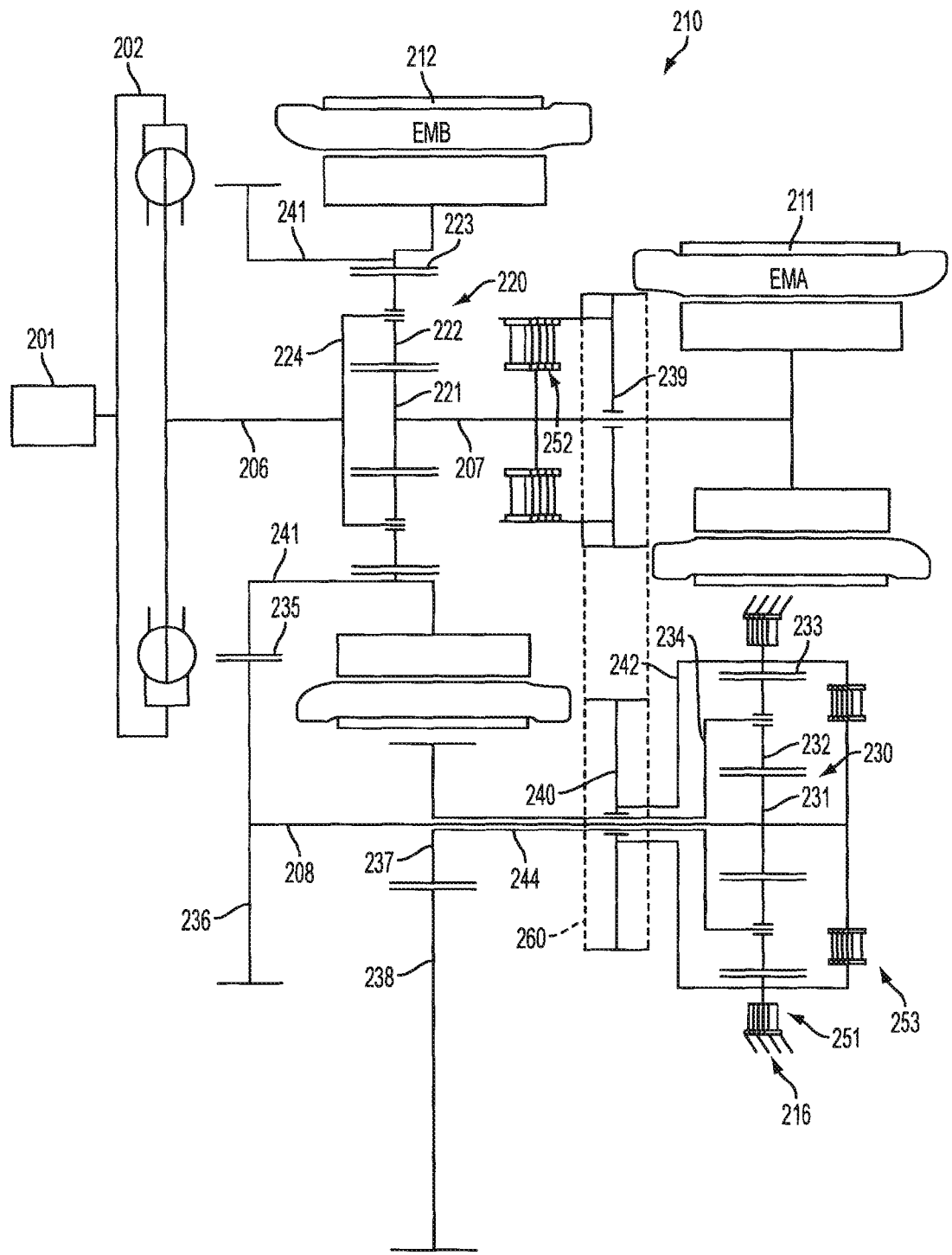
FIG. 2 is a schematic representation of another exemplary hybrid drive unit constructed in accordance with the disclosed principles.

FIG. 2 illustrates an example of another hybrid drive unit 210 according to another embodiment disclosed herein. An engine 201 is coupled to a torsional vibration damper 202. The engine 201 may be any type of power source including an internal combustion engine, turbine engine, electric machine, or any other desired power source. The torsional vibration damper 202 is coupled to a hybrid drive unit 210 by a hybrid input shaft 206. The hybrid input shaft 206 couples the torsional vibration damper 202 to a carrier 224 of a first planetary gear set 220. A plurality of planet gears 222 are rotationally mounted on the carrier 224 and are continuously meshed with a sun gear 221 and a ring gear 223. The sun gear 221 is coupled by a shaft 207 to a first electric machine 211 ("EMA"). The ring gear 223 is coupled to a second electric machine 212 ("EMB"). The first electric machine 211 and second electric machine 212 may be an electric motor, electric generator, or any other type of desired power source.

Shaft 207 is also coupled to a second clutch mechanism 252 that selectively couples shaft 207 to a first driver gear 239. The first driver gear 239 is coupled by a chain drive 260 to a first driven gear 240. The chain drive 260 may be a chain, belt, or any other suitable linkage. The first driven gear 240 is coupled by a shaft 242 to a ring gear 233 of a second planetary gear set 230. The ring gear is continuously meshed with a plurality of planet gears 232 rotationally mounted on a carrier 234. The plurality of planet gears 232 are continuously meshed with a sun gear 231. The sun gear 231 is coupled by a shaft 208 to a second driven gear 236. A first clutch mechanism 251 selectively couples shaft 242 to a hybrid assembly housing 216. A third clutch mechanism 253 selectively couples shaft 242 to shaft 208 and, thereby, sun gear 231.

The second driven gear 236 is continuously meshed with a second driver gear 235 coupled by a shaft 241 to the first electric machine 212 and ring gear 223. The carrier 234 is coupled by a shaft 244 to an output driver gear 237 that is continuously meshed with an output driven gear 238. In one embodiment, the output driven gear 238 may directly or otherwise connected to a vehicle's wheels (not shown).

The hybrid drive unit 210 of FIG. 2 may be operated in two different modes: Mode 1 and Mode 2. To operate the hybrid drive unit 210 in Mode 1, the first clutch mechanism 251 is activated, thereby, coupling shaft 242 to hybrid assembly housing 216. The second clutch mechanism 252 and third clutch mechanism 253 are deactivated. Thus, shaft 207 is free to rotate at a different RPM than first driver gear 239 and shaft 242 is locked. Because the first clutch mechanism 251 is activated, the second planetary gear set 230 is effectively unlocked and loaded. Torque to the output driven gear 238 may be provided by the engine 201 in combination with the second electric machine 211. The first electric machine 212 may be used to generate electricity during vehicle braking or as otherwise desired.

To transition the hybrid drive unit 210 from operation in Mode 1 to operation in Mode 2, the second clutch mechanism 252 is activated. Once the second clutch mechanism 252 is fully activated, the first clutch mechanism 251 is deactivated. During this transition period, the first electric machine 211 is used to provide torque and the second electric machine 212 is used to generate electricity. The engine 201, first electric machine 211, second electric machine 212, or any combination of the three, are used to cause the RPM of shaft 242 to be approximately the same as the RPM of sun gear 231. Once the RPM of shaft 242 is approximately the same as the RPM of sun gear 231, the third clutch mechanism 252 is activated followed by deactivation of the second clutch mechanism 252. In one embodiment, the shifting process includes activation of the second clutch mechanism 252, deactivation of the first clutch mechanism 251, activation of the third clutch mechanism 253, deactivation of the second clutch mechanism 252 and takes approximately 500 milliseconds. In one embodiment, the shift takes more than 500 milliseconds. In another embodiment, the shift takes less than 500 milliseconds.

A shift from Mode 2 to Mode 1 would be performed in a similar manner except that one, or any combination of the engine 201, second electric machine 212, first electric machine 211, would be utilized to cause the RPM of shaft 207 to be approximately the same as the RPM of first driver gear 239. Then, the second clutch mechanism 252 would be activated followed by deactivation of the third clutch mechanism 253. Next, the first clutch mechanism 251 would be activated, followed by deactivation of the second clutch mechanism 252.

To operate the hybrid drive unit 210 in Mode 2, the third clutch mechanism 253 is activated, coupling shaft 242 to sun gear 231. The first clutch mechanism 251 and second clutch mechanism 252 are deactivated. Thus, shaft 242 is free to rotate at a different RPM than hybrid assembly housing 216 and shaft 207 is free to rotate at a different RPM than first driver gear 239. Torque to the output driven gear 238 may be provided by the engine 201 in combination with the second electric machine 212. The first electric machine 211 may be used to generate electricity during vehicle braking or as otherwise desired.

In one embodiment, the first clutch mechanism 51, second clutch mechanism 52, and third clutch mechanism 53 may be any desired type of coupling device including a wet clutch, dry clutch, dog clutch, or multi-plate clutch. In one embodiment, the clutch mechanisms 51, 52, 53 may couple together two components when they are rotating within a predetermined RPM of each other. For instance, the clutch mechanisms 51, 52, 53 may couple together two components once they are rotating within approximately 50 RPM of each other. In another embodiment, the clutch mechanisms 51, 52, 53 may couple together two components once they are rotating within greater than or less than 50 RPM of each other. As an example, a wet clutch, dry clutch, or multi-plate clutch may be used to couple together two components rotating within approximately 50 RPM of each other. In another embodiment, the clutch mechanisms 51, 52, 53 may couple together two components only once they are rotating at approximately the same RPM. As an example, a dog clutch may be used to couple together two components rotating at approximately the same RPM.

Thus, a hybrid transmission providing multiple modes of operation in a compact arrangement is disclosed herein. Moreover, the hybrid transmission includes smaller and more compact electric machines. The hybrid transmission also features simpler construction than prior art designs, because it utilizes fewer parts.

What is claimed is:

1. A hybrid drive unit, comprising:
   a first planetary gear set connected to an input shaft and a second planetary gear set connected to the first planetary gear set by an electric machine shaft;
   a first electric machine connected to the first planetary gear set and a second electric machine connected to the first and second planetary gear sets by the electric machine shaft;
   an output shaft selectively directly coupled to the electric machine shaft by a first clutch mechanism, wherein the input shaft, electric machine shaft and output shaft are distinct shafts that share a common axis of rotation;
   a second clutch mechanism configured to selectively couple the first electric machine to the second planetary gear set;
   a drive shaft connected to the second planetary gear set by a first driven gear and to the output shaft by at least one drive gear, wherein the drive shaft is parallel to and spaced apart from the electric machine shaft;

wherein the output shaft is configured to be i) selectively directly connected to the second electric machine via the electric machine shaft by activation of the first clutch mechanism and ii) indirectly coupled to the second electric machine via the second planetary gear set and the drive shaft; and wherein the drive shaft extends parallel to the electric machine shaft and external to and around the second electric machine.

2. The hybrid drive unit of claim 1, further comprising a third clutch mechanism configured to selectively couple the second planetary gear set to a hybrid drive unit housing.

3. The hybrid drive unit of claim 2, wherein the third clutch mechanism selectively couples a ring gear of the second planetary gear set to the hybrid drive unit housing.

4. The hybrid drive unit of claim 3, wherein the hybrid drive unit is configured to operate in three different modes of operation comprising a first mode, a second mode and a third mode, each of the three modes of operation activated by activating at least one of the first, second and third clutch mechanisms.

5. The hybrid drive unit of claim 4, wherein activation of the third clutch mechanism and deactivation of the first and second clutch mechanisms configures the hybrid drive unit for operation in the first mode;

wherein in the first mode, torque is provided to the output shaft via the drive shaft and the electric machine shaft is decoupled from the output shaft and free to rotate at a different speed than the output shaft.

6. The hybrid drive unit of claim 5, wherein, in the first mode, torque is provided to the output shaft by the second electric machine and the first electric machine is used to generate electricity.

7. The hybrid drive unit of claim 3, wherein the first electric machine is connected to a sun gear of the first planetary gear set and the second electric machine is connected to a ring gear of the first planetary gear set via the electric machine shaft.

8. The hybrid drive unit of claim 4, wherein activation of the second clutch mechanism and deactivation of the first and third clutch mechanisms configures the hybrid drive unit for operation in the second mode; and wherein in the second mode, torque is provided to the output shaft via the drive shaft and the electric machine shaft is decoupled from the output shaft and free to rotate at a different speed than the output shaft and the ring gear of the second planetary gear set is free to rotate at a different speed than the hybrid drive unit housing.

9. The hybrid drive unit of claim 8, wherein, in the second mode, torque is provided to the output shaft by the first electric machine and the second electric machine is used to generate electricity.

10. The hybrid drive unit of claim 4, wherein activation of the first and second clutch mechanisms and deactivation of the third clutch mechanism configures the hybrid drive unit for operation in the third mode;

wherein in the third mode, torque is provided to the output shaft via the electric machine shaft by activation of the first clutch mechanism and the first electric machine is coupled to the second electric machine by activation of the second clutch mechanism.

11. The hybrid drive unit of claim 10, wherein, in the third mode, torque is provided to the output shaft by the second electric machine and the first electric machine is used to generate electricity.

12. The hybrid drive unit of claim 1, wherein the first clutch mechanism and the second clutch mechanism are selected from a group consisting of a wet clutch, dry clutch, dog clutch, and multi-plate clutch.

13. The hybrid drive unit of claim 1, wherein the first clutch mechanism and second clutch mechanism are dog clutches.

14. A hybrid drive unit, comprising:

a first planetary gear set connected to an input shaft and a second planetary gear set connected to the first planetary gear set by an electric machine shaft;

a first electric machine connected to the first planetary gear set and a second electric machine connected to the first and second planetary gear sets by the electric machine shaft;

an output shaft selectively directly coupled to the electric machine shaft by a first clutch mechanism, wherein the input shaft, electric machine shaft and output shaft are distinct shafts that share a common axis of rotation;

a second clutch mechanism configured to selectively couple the first electric machine to the second planetary gear set; and a drive shaft connected to the second planetary gear set by a first driven gear and to the output shaft by at least one drive gear, wherein the drive shaft is parallel to and spaced apart from the electric machine shaft;

wherein the output shaft is configured to be i) selectively directly connected to the second electric machine via the electric machine shaft by activation of the first clutch mechanism and ii) indirectly coupled to the second electric machine via the second planetary gear set and the drive shaft;

wherein the first planetary gear set further comprises:

a sun gear connected to the first electric machine, a carrier connected to the input shaft, and a ring gear connected to the second electric machine via the electric machine shaft; and wherein the second planetary gear set further comprises a sun gear directly connected to the ring gear of the first planetary gear set via the electric machine shaft.

15. The hybrid drive unit of claim 14, wherein the drive shaft extends parallel to the electric machine shaft and external to and around the second electric machine.

16. The hybrid drive unit of claim 14, wherein the second planetary gear set further comprises a carrier selectively directly coupled to the sun gear of the first planetary gear set by the second clutch mechanism;

the carrier of the second planetary gear set is coupled to the output shaft via the at least one drive gear, the first driven gear and the drive shaft; and the ring gear of the first planetary gear set, the sun gear of the second planetary gear set, and the second electric machine are all selectively directly coupled to the output shaft by the first clutch mechanism.

17. The hybrid drive unit of claim 16, wherein the ring gear of the first planetary gear set, the sun gear of the second planetary gear set, the second electric machine and the first clutch mechanism are all directly coupled to the electric machine shaft.

* * * * *